Figure 1:
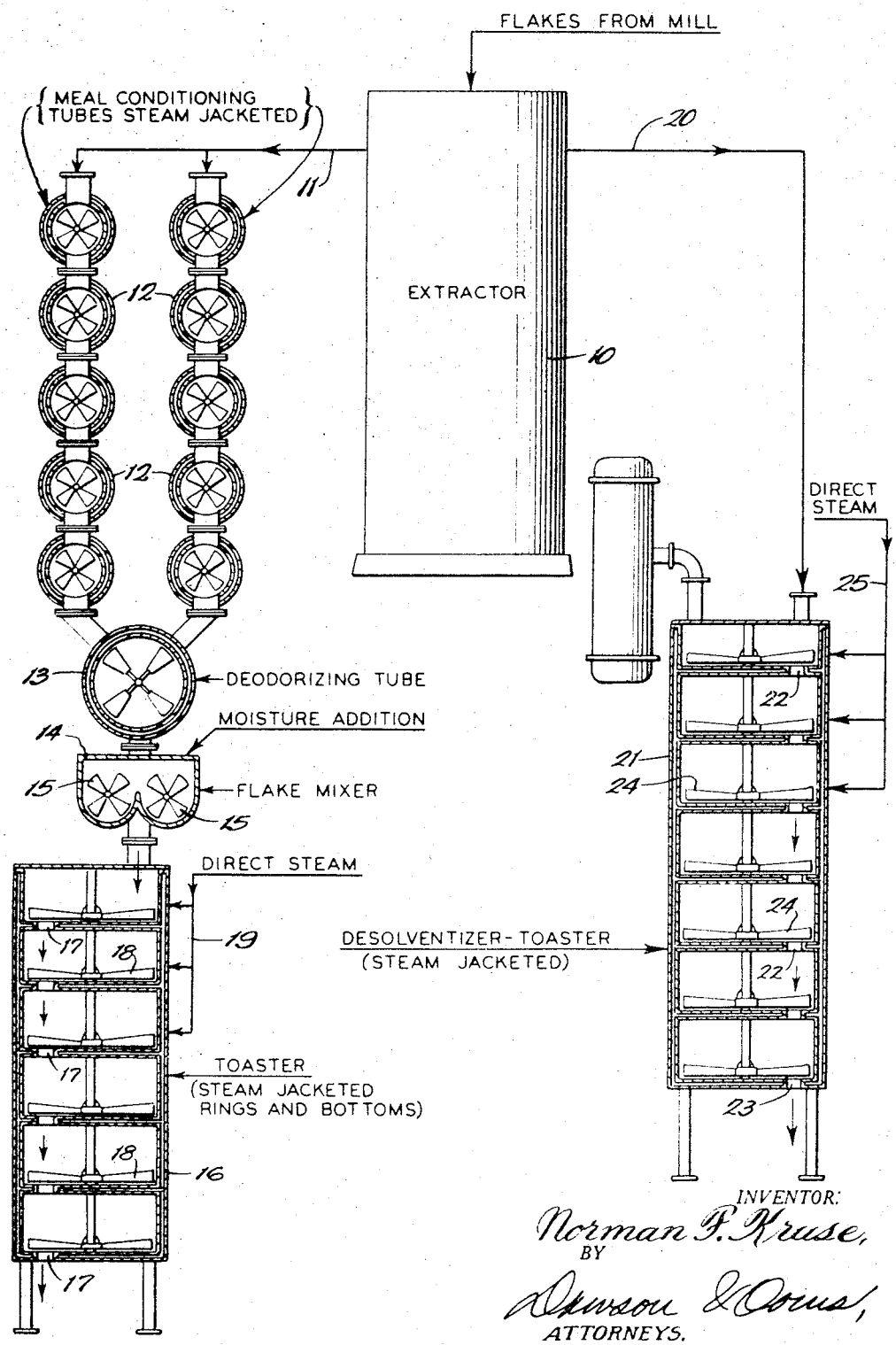

June 7, 1955  N. F. KRUSE  2,710,258
SOY BEAN PRODUCT
Filed July 14, 1954  3 Sheets-Sheet 3
Fig.4
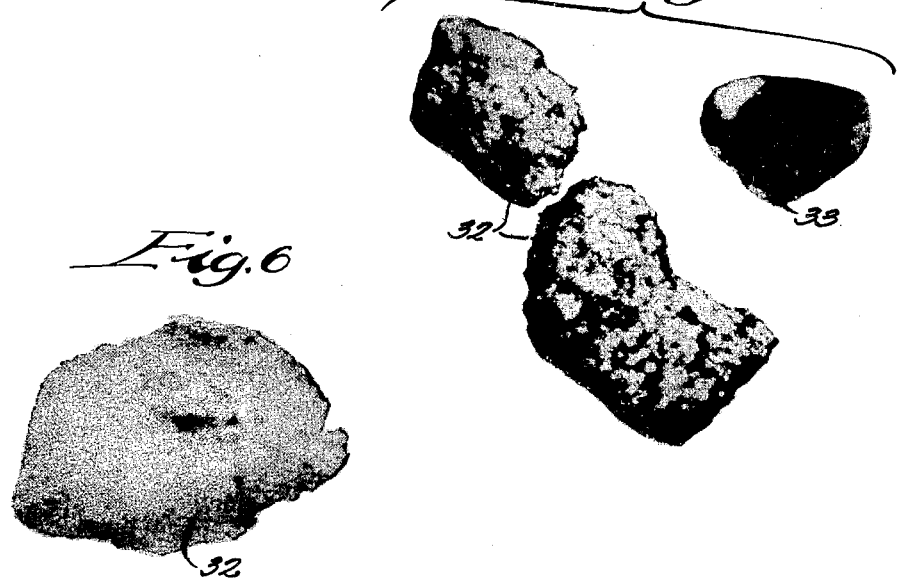
Fig.5
Fig.6
INVENTOR:
Norman F. Kruse.
BY
Dawson & Ooms,
ATTORNEYS. 

United States Patent Office 2,710,25
Patented June 7, 195

2,710,258

SOY BEAN PRODUCT

Norman F. Kruse, Decatur, Ind., assignor to Central Soya Company, Inc., Fort Wayne, Ind., a corporation of Indiana Application July 14, 1954, Serial No. 443,263

1 Claim. (Cl. 99—98)

This invention relates to a cooked soy bean product, and more particularly to a product obtained in a process in which extracted soy bean oil meal is cooked or toasted while preserving in the finished product a high water-soluble protein content, high thiamin content, and other nutritional factors.

This application constitutes a continuation-in-part of my co-pending application, Serial No. 195,059, filed November 10, 1950, which has now matured into U. S. Patent No. 2,585,793, and of my copending application Serial No. 211,351, filed February 16, 1951.

In United States Patent No. 2,260,254, I have set out advantages flowing from the wetting of soybean oil meal and thereafter subjecting the meal to temperatures above the boiling point of water to develop a food product. One difficulty arising out of the use of the process is with obtaining an even distribution of the moisture throughout the meal. Extracted soybean oil flakes, after the removal of solvent therefrom, are highly porous and contain cells from which the oil has been extracted. It is difficult to bring the moisture into the irregular cell surfaces and in the subsequent heating step such surfaces are treated without moisture being present. As a result, dry heat only is applied to such surfaces and there is a substantial loss of thiamin content and nutritional factors. While there is a substantial advantage obtained with respect to those surfaces which are effectively treated with moisture, there is a loss with respect to the large irregular surfaces and cell areas to which the moisture is not applied.

It has been proposed that steam be utilized for the removal of solvent from substantially oil-free solvent-saturated soybean flakes, care being taken to prevent the flakes from becoming wet so as to adhere to one another. In such a process, the flakes are spread out in a very thin layer and the temperatures have been maintained at an elevated point to prevent steam condensation on the flakes and such adherence of the flakes to each other. The difficulty with such a process which is designed only for the removal of solvent is that there is no effort or provision made to raise and maintain a high flake moisture content which would preserve the water-soluble protein, thiamin, and nutrients.

In the removal of solvent from solvent laden flakes, if large quantities of jacket heat are employed with small quantities of live steam, the solvent is vaporized and removed from the cell areas of the soybean oil meal in such a manner that no steam condensation upon the meal particle is permitted, thereby subjecting the meal during processing to undesirable dry heat.

However, if the extracted soybean oil meal be freed of solvent prior to the cooking step as is done in conventional processing methods and then subjected to steam, an effective process is not provided because the steam cannot be employed in sufficient quantities to impart the necessary moisture to the dry flakes. The addition of a relatively small amount of steam raises the meal to a fairly high cooking temperature and there is thus no opportunity to add moisture in substantial amounts to the meal. Th addition of jacket steam or insufficient quantities of dire steam, alone or in combination, to the dry desolventize flakes after extraction has been found not to produce good result. This is due to the fact that such heat inp results in the rapid drying of the product so that th extracted soybean oil meal is toasted or cooked with e sentially dry heat. Under such conditions the resultin product has had some of its valuable nutrients destroye as well as possessing undesirable physical characteristi such as friability and dustiness.

On the other hand, the addition of large quantities c water to the product prior to cooking does not offer complete solution to the problem because the water do not thoroughly or uniformly penetrate the flakes, and find that some of the flakes have insufficient moistu while others have excessive moisture. Those with e cessive moisture become glutinous or glue-like in cha acter and those with insufficient moisture are injured i the cooking process.

I have discovered that by adding liquid to the flake such as water or solvent (and the solvent employed i extraction may be retained for this purpose), sufficie direct steam with reduced quantities of jacket steam ca be added to the extracted soybean oil meal to bring th moisture to about 15% and above as a result of conde sation of the steam, and that by such condensation th moisture is applied evenly throughout the meal ma so as to apply to each flake its desired quantity of moistu and without excessively adding to the moisture of oth flakes. At the same time, the condensation of the stea on the meal surfaces serves as a metering of the moistu to give to each flake more or less moisture depending up the size of the flake, while also applying moisture with the irregular cell surfaces. If a flake is small, it receives relatively small amount of moisture, while if it is larg it receives a proportionately large amount of moisture, a in each instance the moisture is applied, by the condens tion method, within the difficultly accessible cell area As a result, the flankes are increased throughout in dens by the moisture. It seems probable that the solve which saturates the flakes, when heated suddenly by t introduction of steam, vaporizes rapidly and tears t cell walls apart, causing the cellular protoplasm of se eral flakes to run together to form continuous prote masses. The large volume of moisture present is believ to act as a protective influence so that such protoplasm protein material is obtained with a minimum of loss water soluble protein, thiamin and other nutritive facto Further, heat is transmitted more readily into the i terior portions of the flake so that it is effectively cook quickly while preserving the thiamin content and oth nutritional factors. I was surprised to find that ev though agglomerates were formed, the continued viole steaming with direct steam removed all of the residu solvent while exerting a preserving action on the thiam or $B_1$ and other nutritional factors, while altering t protein in the meal to give a high value in nutrients. T agglomerates produced are of a uniform golden col throughout and are thus indicative of the high nutrie value extending through the structure of the flake a glomerates.

An object of the present invention is to treat or co extracted soybean oil meal under heating conditions which direct steam is employed in such quantity as destroy the cellular organization of the bean oil me liberating the cellular contents to form a product having high water-soluble protein and thiamin content.

A further object is to provide a soybean oil meal pro uct characterized in that the cellular organization there is substantially destroyed and the cellular contents li erated and coalesced to form amorphous masses in whi the water-soluble protein content is retained to a high degree.

Yet another object is to provide a cooked soybean oil meal product to which moisture is applied in a relatively high percentage as the cellular organization thereof is being disrupted, whereby the protein contents of the bean flow together to form amorphous masses which are highly nutritive and which retain a high water-soluble protein content and thiamin content.

A further object is to prepare a soybean product by a mode of treatment which liberates the protein contents of the beans while preserving their nutritive factors, water-soluble protein and thiamin content, and while producing a cooked product giving a greater growth efficiency than that heretofore obtained with soybean meals, and in fact a greater growth and feed efficiency as compared with dried skimmilk.

A further object is to produce a soybean oil meal product having a bright opalescence appearance with a high bulk density and free of dusty friable characteristics.

Other specific objects and advantages will appear as the specification proceeds.

The process employed in the production of the new product may be carried on in a great variety of apparatus. An illustrative apparatus with which the process may be employed, together with photographs illustrating soybean flakes in various steps of processing and the soybean product forming my invention, are shown in the accompanying drawings, in which—

Figure 2:
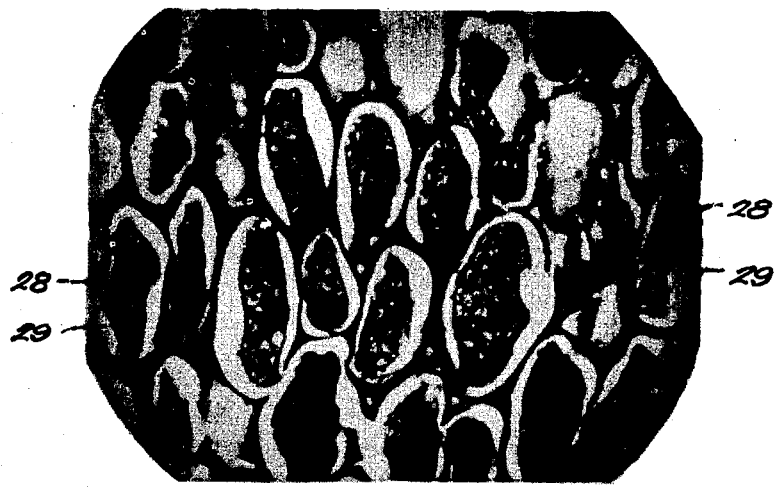
Figure 3:
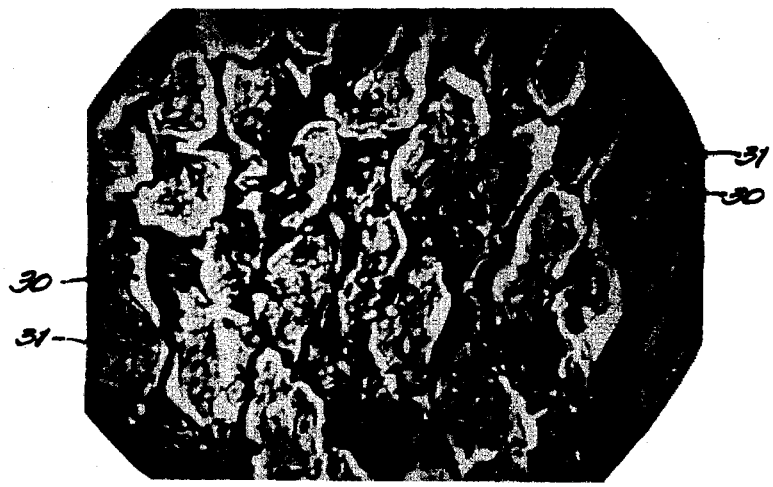

Figure 1 is a view in elevation and partly in section of apparatus diagrammatically showing two forms of apparatus with which the process may be employed; Fig. 2, a photographic reproduction of a section of a flaked soybean highly magnified; Fig. 3, a view similar to Fig. 2 of the soybean material magnified as in Fig. 2 but after the soybean material has been toasted or cooked under existing soybean-toasting processes in which steam is not added in substantial amounts; Fig. 4, a view similar to Fig. 2 but showing the soybean material after treatment in accordance with the new process described herein; Fig. 5, a top plan view representing a photographic reproduction of cooked soybean meal products when viewed through a microscope and with a light impinged upon the meal particles at an angle of 45°, the two highly reflective or opalescent particles representing my new product, and the dark particle representing the old toasted meal product; and Fig. 6, a view similar to that shown in Fig. 5 of a single cooked oil meal particle which is highly opalescent when viewed through a microscope and with a light beam impinged upon the particle at an angle of 45°.

In Figure 1 of the drawing, an extractor is indicated by the numeral 10. In the extractor, the soybean meal, which is preferably in the form of flakes, is subjected to a suitable solvent for the removal of the soybean oil. Oil-laden solvent is withdrawn and sent to a recovery still for the separation of the solvent from the oil. The solvent-saturated flakes may then be treated in accordance with my process after the solvent is removed or, if desired, with the solvent still retained by the flakes. Since the apparatus described in the drawing is all well-known in the art, a detailed description of the apparatus is believed to be unnecessary.

In the drawing, two forms of treating apparatus are described. In one form the solvent is removed prior to the addition of moisture to the flakes, while in the other apparatus the solvent-saturated flakes are sent directly to a compartmented cooker in which the solvent is removed and moisture added to the flakes within the cooker.

In the apparatus for first removing the solvent before adding moisture, the solvent-saturated flakes are withdrawn from the extractor through line 11 and thence passed through steam jacketed agitator-equipped tubes 12, and thence into a deodorizing tube 13. The solvent vapors are withdrawn and the flakes substantially free of solvent are passed into a mixer 14, to which water is added and the water is mixed with the flakes by the use of agitators 15. I prefer to add sufficient water to bring the moisture content of the flakes up to about 14% or 15% to about 25% or 30%. If desired, the moisture may exceed 30%.

The wet flakes from the mixer are passed into a steam jacketed cooker, compartmented cooker 16 having openings 17 between the compartment floors and having a slow speed rotary-driven member 18 for spreading the flakes and discharging them through the openings 17. The flakes are passed downwardly through the compartments and are discharged through the outlet 18.

Into several of the compartments, and preferably the upper compartments, I discharge direct steam as indicated by the line 19, so that the steam is violently discharged into the body of the flakes, permeating the flake body with condensation of moisture on the flakes and a very rapid elevation of temperature. The added water is largely evaporated later in the process. While in United States Patent No. 2,260,254 I advocated the addition of moisture sufficient to bring the content of the meal to at least 15%, I find that, by reason of the effective metering of the moisture to the individual flakes through the medium of steam condensation, a lower moisture content can be employed, ranging from about 14% upward. While the moisture may exceed 30%, I prefer not to go above this percentage. I find that optimum results are obtained when the moisture content is in the neighborhood of 15% to 20%.

The jackets preferably extend about the outside of the compartments and also within the floors of the compartments so that jacket steam may thus be employed about each compartment. It is important, however, that the temperature of the jackets be kept at a point below that which would interfere with effective condensation of the steam and only sufficient jacket steam is employed to prevent the material from sticking to the walls or bottom of the compartments. Thus the direct steam is utilized for its important function of supplying moisture to the individual flakes while also rapidly supplying heat to the innermost surfaces and areas of the flakes.

The addition of moisture to the extracted soybean oil meal increases the specific heat of the meal itself so that the introduction of direct steam into the mass causes considerable steam condensation with heat recovery to produce quick cooking and the development of desirable characteristics. This moist heat process preserves valuable nutrients which dry heat would otherwise destroy. Another desirable effect that is obtained in the liquid-steam process is that of maintaining the moisture content at a relatively high level during the cooking or toasting process. This is important to produce the chemical changes necessary to develop the nutritional qualities and impart the desired physical characteristics.

In the other form of apparatus, in which the solvent-laden flakes are directly treated in a compartmented cooker, the solvent-saturated flakes are withdrawn through line 20 and introduced into the jacketed compartmented cooker 21, which may be very similar to the cooker 16 already described. The flakes are fed downwardly through ports 22 through the various compartments and exit at 23. The sweeps 24 spread the material and feed the flakes downwardly through the several cooking compartments. Into the upper compartment or compartments, I introduce direct steam through line 25 in large amounts so as to vaporize the solvent and remove it. I prefer to introduce a large amount of steam in the uppermost compartments to remove the solvent there and to introduce reduced amounts of steam in the compartment or compartments below. By putting a greater amount of steam in the uppermost compartment, I am able to eliminate the solvent at this stage while at the same time providing a great deal of steam for condensing and providing the moisture in the meal at the very beginning of the cooking process.

The vaporization of the solvent enables me to use a large quantity of direct steam without overheating the flakes and the large amount of steam is thus available for condensing upon the surface areas of the flakes to give each its proper content of moisture. I prefer to employ a content of about 14% and up to about 25%, although if desired the content of moisture may be raised to 30% or higher. I find that optimum results are obtained when the moisture is in the neighborhood of 15%. As the meal passes through the compartmented cooker, the moisture of the flakes in contact with the sweeps produces agglomerates, but while such agglomerates are formed, it is surprising to find that the continued violent steaming removes all of the residual solvent while at the same time exerting a preserving action on the $B_1$ and the other nutritional factors, while developing new valuable physical characteristics in the product. The protein present in the meal is altered to give a higher nutritional value and the agglomerates acquire a uniform golden color throughout. The meal increases substantially in density while retaining a very high thiamin content. By reason of the increase in density formed by the addition of moisture, there is more effective heat transfer to the interior of the flake particle so that the cooking is more uniform throughout and there is very slight difference between the temperature on the outer surface of the particle and that within the interior of the particle.

The maintenance of the moisture at the high levels above indicated during cooking or toasting temperatures enhances the nutritive value of the resulting product. I am not able to explain why the chemical changes produced improve the nutritive value of the resulting product. It may be that of producing a greater availability of the methionine-cystine complex—the moisture in the process having a hydrolytic effect on these amino acids— or the greater preservation of the essential amino acids, lysine, tryptophane, and probably others—and/or the more efficient destruction of the anti-trypsin enzyme present in raw extracted soybean oil meal—account for the improved nutritive value. Because of the more efficient effect of high moisture in destroying the anti-trypsin enzyme, less heat and a shorter period of time are required to produce a more nutritious product containing more of the essential vitamins and amino acids.

In all of the processes described above, I employ a temperature which is above the boiling point of water at substantially atmospheric pressure and during the cooking operation I prefer to keep the meal in motion. A desirable top temperature in the heating or cooking operation is between 225° and 265°. I prefer to employ a temperature not above 300° F. The cooking is desirably and more conveniently done at atmospheric pressure, but it will be understood that higher or lower pressures may be employed.

The number of compartments in the cookers may be varied considerably depending upon the results desired. For some products, I find that three or four compartments are satisfactory, and it is possible to use a single compartment. As above stated, the number of compartments may be varied as desired and in accordance with the quality or characteristics of product sought.

The new soybean oil meal, after the above cooking or toasting process, is found to have a water-soluble protein content of from 7% to 15% and a thiamin content of about 6 to 11 micrograms per gram of meal. It has a very low urease activity of less than 0.06 (as measured by method for determining inadequately heated soybean meal—Caskey, C. D., and F. Knapp, Ind. Eng. Chem. (Anal. Ed.) 16: 640–641), and a bulk density lb./cu. ft. of about 41. The moistened flakes during the cooking tend to form agglomerates, and the agglomerated product, after cooling, is ground to produce the final product.

Soybean meal has been treated with moisture and cooked to produce a feed product both under atmosphere and pressure conditions, but the products thus obtained, in so far as I have been able to find, have the general structure illustrated in Fig. 3 in which the cellular organization of the flake or soybean section is retained and the protein content is characterized by loose protein aggregations therein. In order to determine the structures of the bean flake or meal and the effect of the cooking treatment thereof, I have caused sections to be made of the flaked bean containing solvent prior to the cooking step and for the purpose of photographing the same, the product has been stained so as to make the protein stand out clearly from the cellulose material. For example, in preparing the material for photographing in Figs. 2, 3 and 4, the sectioned bean has been stained with safranin, which picks up the protein material and makes it stand out clearly. At the same time, the bean material has been stained with fast green, which picks up the cellulose material. As a result, the cellulose material of the bean shows up in the product as green, while the protein material shows up as red. The stained product was then photographed by color photography, and black and white prints were made from the color negatives to produce Figs. 2, 3 and 4. In the black and white reproductions of Figs. 2, 3 and 4, the green or cellulose material shows up as white, while the protein (red) material shows up as a dark mass.

In comparing the meal or flakes as shown in Fig. 2 prior to cooking, and as shown in Fig. 3, after cooking with the present-day processes, it will be observed that the cellular organization of the flakes persists after the cooking treatment and the protein masses remain still loosely organized and broken by crevices extending between the masses.

My new product, as illustrated in Fig. 4, is characterized by the fact that the cellular organization of the flake or meal particles is completely destroyed and the protein content of the cell is liberated and merges with the protein content of other cells to form bodies which are continuous in character. In other words, such bodies have a continuous surface that is substantially uninterrupted and the protein bodies are amorphous in character, resembling somewhat the meats of English walnuts. These merged, irregular masses of protein retain no resemblance to the cellular organization shown in Fig. 2 and the broken fragments of cellulose shells or walls are scattered throughout the meal body without following any defined pattern.

In Fig. 4, I have indicated protein masses by the numeral 26, and fragments of the cell walls by the numeral 27. The protein masses of the uncooked flake are indicated in Fig. 2 by the numeral 28 and the surrounding cellulose walls by the numeral 29. In Fig. 3, the cell walls are indicated by the numeral 30, and the protein contents by the numeral 31.

In Fig. 5, 32 designates particles of the new product, while 33 designates a particle of meal made by processes heretofore employed. Particle 32, when exposed to a light beam directed at an angle of 45° thereto, becomes highly opalescent over substantially the entire surface. On the other hand, particle 33, when exposed to a light beam directed at an angle of 45° thereto, presented the dark and non-reflective surface shown in Fig. 5. Particle 33 in this respect was found to be representative of all of the cooked soybean oil meals, whether made by atmospheric toasting or pressure toasting and with or without the addition of water thereto. The particles 32 differed from the prior meals in that they alone became opalescent when the light beam was impinged thereon at an angle of 45°. This characteristic is also apparent without the aid of the microscope as the new meal particles have a bright appearance due to the reflectance of light.

In Fig. 6, a single particle of cooked meal formed in accordance with the present invention was exposed to a beam of light directed thereon at an angle of 45° and became highly opalescent. The opalescence of the particle over its entire area is shown by the photograph thereof in Fig. 6. This opalescence is further evidence that the cell walls of the soybean oil meal particles have been ruptured by this new process.

As to why a product of the above character in which the cellular organization is substantially destroyed and amorphous masses of protoplasm from the cell are formed by the merging of the cell contents while preserving an unusually high water-soluble protein content and thiamin content, is produced, I am unable to say. It is possible in the treatment of the solvent-saturated soy flakes by the sudden introduction of a large amount of steam, that the solvent vaporizes with such speed that the cell walls are destroyed while at the same time, the presence of a large amount of moisture condensing upon the released protein serves as a protective influence for the protein now exposed and as the protein masses merge, the moisture condensate prevents the loss of thiamin and water-soluble protein. The condensation of the steam on the irregular surfaces applies a uniform film of moisture over the protein bodies to protect them. Whatever be the reason of explanation, the microscopic studies of the product after treatment disclose that the protein bodies are no longer separated by fissures or gullies but now are merged together in rather large bodies with substantially continuous top surfaces and retain from 7% to 15% of water-soluble protein. This change in structure probably explains why the particles show such a high degree of light reflectance with the opalescent appearance.

The thiamin content of the new product is found to be twice that of the best competitive meals now on the market, while the water-soluble protein content is 50% in excess of that of such competitive meals.

The growth efficiency of the new soybean oil meal is found to exceed even the efficiency of dried skimmilk, which has been considered as the standard in the testing of protein foods. Tests have been carried on with weanling white male rats of the Sprague-Dawley strain, in which the rats have been fed semi-purified diets containing adequate amounts of energy, fat, minerals and vitamins. The diets were fed for six weeks and equated to contain 15% crude protein with the source of the protein being the variable. The tests disclose that, as compared with the dried skimmilk protein, the new soybean oil meal processed as herein described gave growth gains greater by more than 20% than the gains using dried skimmilk. While some tests showed a growth gain less than 20% above the gain effected through the use of dried skimmilk, in all tests the new soybean oil meal was fully equal in all respects to the protein of good quality dried skimmilk in producing growth, while in many instances giving a growth gain, as above stated, greater by 20% than that of the dried skimmilk.

Specific examples of the process may be set out as follows:

*Example I*

Extracted soybean flakes remaining after the oil removal in the extraction process are desolventized in conventional type of equipment consisting of steam jacketed conveyor tubes in which the solvent is evaporated by means of direct and indirect steam to produce desolventized flakes of 10% moisture content.

These desolventized extracted soybean flakes at a temperature of approximately 180° F. are then conveyed continuously to a paddle type mixer at the rate of 20 tons per hour. To this flow of flakes a continuous stream of water is applied at the rate of 480 gallons per hour, which combined with that moisture already present in the flakes, produces a total moisture content in the flakes of 20%.

These water-wetted flakes are discharged into a steam jacketed compartmented cooker fitted with a power driven agitator and gate mechanisms for continuous discharge of material from one compartment to another throughout the machine.

Provisions are made for the introduction of direct steam through pipe jets which project into the material. The steam is applied at the rate of 800 lbs. per hour directly to the flow of the wetted flakes into the machine and continues throughout the early stages of the toasting process. This causes the water wetted extracted soybean oil meal to be rapidly raised within a few minutes to a temperature above the boiling point of water with considerable steam condensation simultaneously occurring upon the extracted soybean oil meal particles. The temperature of the extracted soybean meal is further elevated with the application of jacket heat which causes continued violent steaming and diffusion of moisture throughout the beds of extracted soybean oil meal. Finally, when a temperature of approximately 220° F. is reached, the evaporation rate of the water from the extracted soybean oil meal exceeds the condensation rate of the steam upon the meal particles. This permits drying to take place in the latter stages of the process with the further elevation of the meal temperature to 230° F. and reduction in the extracted soybean oil meal moisture content to 13% to 15% as the meal is discharged from the unit.

This extracted soybean oil meal is further dried, cooled, ground and classified to the finished product in the conventional equipment for these unit processes.

*Example II*

In the process outlined as Example I equally beneficial results may be obtained by using wet steam such as that obtained from a condensate system.

This wet steam is introduced into the paddle type mixer using a sufficient quantity to raise the moisture content of the meal to 20% and rapidly elevate the meal temperature to near the boiling point of water. In this case, the steam condensation causes the earlier elevation of the meal temperature and this hot material is then delivered into the steam jacketed compartmented cooker with the succeeding stages of the process proceeding as outlined in Example I.

*Example III*

The process as outlined in Example II could equally well be performed by using conventional drying machinery to accomplish the continued steaming, elevation of meal temperature and drying stages of the process.

*Example IV*

Soybean flakes remaining after the oil removal in the extraction process are partially desolventized in the conventional type of equipment consisting of steam jacketed conveyor tubes in which the solvent is evaporated by means of direct and indirect steam. When the solvent content of the flakes has been reduced from about 35% to approximately 20% and the temperature has increased to above the boiling point of the solvent used, wet steam (see Example II) is introduced to the partially stripped flakes in adequate amounts to not only remove the final quantities of solvent, but also to simultaneously raise the moisture content of desolventized flakes to 15% or greater.

Having already increased the moisture of the flakes by the process outlined above, it is not necessary to add additional quantities of water in a paddle type mixer. Therefore, the flakes may then be directly introduced into the cooking-toasting type of equipment described in Examples I and III.

*Example V*

To soybean flakes remaining after the oil removal in the extraction process and still containing all of the adhered solvent is added approximately 5% of water. This added liquid to that already present on the flakes makes it possible to condense large quantities of direct steam on the flakes as well as to improve the thermal conductivity properties of the mixture with respect to direct and indirect steam heat. The net result of this is the rapid removal of solvent and the simultaneous accomplishment of the cooking process previously discussed.

*Example VI*

Soybean flakes remaining after the oil removal in the extraction process and still containing adhered solvent are continuously conveyed at the rate of 28 tons per hour into a vapor-tight, steam jacketed, compartmented cooker fitted with a power driven agitator and gate mechanism for the discharge of material from one compartment to another throughout the machine.

Direct steam at the rate of 4000 pounds per hour is introduced beneath the bed of flakes in the top compartment or compartments of the cooker. With the simultaneous condensation of the steam on the flake particles, the solvent is removed and the temperature of the flakes rises very rapidly to 210° F. It should be noted that the extraction process must be controlled to leave sufficient solvent adhered to flakes, to cause enough steam to condense and raise the flake moisture content above 15%. The temperature of the meal is further elevated with the application of jacket heat which causes continued violent steaming and diffusion of moisture throughout the beds of meal. Finally, when a temperature of approximately 220° F. is reached, the evaporation rate of the water from the meal exceeds the condensation rate of the steam upon the meal particles. This permits drying to take place in the latter stage of the process with the further elevation of the meal temperature to 230° F. and reduction in meal moisture to 13% to 15% as the material is discharged from the unit.

This meal is further dried, cooled, ground and classified to the finished product in the conventional equipment for these unit processes.

*Example VII*

This process is the same as in Example VI but instead of controlling the amount of solvent adhered to flakes from the extraction process, additional solvent is added to the solvent-wetted flakes in the top compartment to insure that sufficient live steam will be condensed to raise the moisture content of the flakes above 15%.

*Example VIII*

This process is the same as Examples VI or VII to the point where the solvent is removed and the moisture content of the meal has increased to 15% or above. This material is then introduced into a conventional type pressure cooker or toasted where the temperature of the meal is further elevated, causing continued violent steaming and diffusion of moisture throughout the meal.

This extracted cooked or toasted soybean oil meal is then dried, cooled, ground and classified to the finished product in conventional types of equipment for these unit processes.

The product of the above-described process consists of an extracted soybean oil meal having particles of definite rounded structure as distinguished from flaked particles, with a uniform, yellowish-brown particle coloration free of light colored or white particles, a bulk density of over 40 lbs./cu. ft., practically dust free, a thiamin content in excess of 50% of that of the original extracted flakes, free of harmful urease activity, and having high nutritional value due to the availability of essential amino acids.

The soybean oil particle is free of cellular arrangement or organization. The cellular organization has been substantially destroyed and the protein contents of the bean have been liberated and coalesced to form amorphous masses having a water-soluble protein content of from 7% to 15% and having a thiamin content of 6 to 11 micrograms per gram of meal. The particles are opalescent over substantially their entire surfaces when a light beam is impinged thereon at an angle of 45° and the article is viewed from a microscopic lens placed above the particle. The high thiamin content is believed to be a fair index that the protein material has not been overheated in the treatment and that it has been fully protected during the cooking operation.

I claim:

A soybean product, comprising a cooked, substantially oil-free soybean meal, said meal being unlike prior cooked soybean meals in that its cellular organization has disappeared and the protein thereof has coalesced into irregular masses, the meal being characterized by the fact that the irregular masses of protein are opalescent when a light beam is impinged thereon at an angle of about 45°, whereas the prior meals are opaque under such light beam impingement, the bulk of the masses of protein having continuous irregular surfaces which are substantially greater in area than the area of any original cell of the soybean, said meal being uniformly yellowish-brown in color and having a water-soluble protein content of from 7% to 15% and a thiamin content of from 6 to 11 micrograms per gram of meal.

References Cited in the file of this patent

UNITED STATES PATENTS

| | | |
|---|---|---|
| 2,130,087 | Hasbrouck | Sept. 13, 1938 |
| 2,148,142 | Wait | Feb. 21, 1939 |
| 2,172,699 | Cohn | Sept. 12, 1939 |
| 2,260,254 | Kruse | Oct. 21, 1941 |
| 2,316,458 | Scalise | Apr. 13, 1943 |